_United States Patent_ [19]

Kim

[11] Patent Number: 4,605,184

[45] Date of Patent: Aug. 12, 1986

[54] AERODYNAMIC HEATED STEAM GENERATING APPARATUS

[76] Inventor: Kyusik Kim, 5026 Rhoads Ave., Santa Barbara, Calif. 93111

[21] Appl. No.: 513,179

[22] Filed: Jul. 13, 1983

[51] Int. Cl.[4] .............................................. B64D 41/00
[52] U.S. Cl. ........................................ 244/58; 165/42; 165/44; 60/39.53
[58] Field of Search ............. 244/117 A, 58, 59, 53 R; 62/DIG. 5; 165/41, 42, 44; 60/39.05, 39.53, 39.54, 39.55

[56]  References Cited

U.S. PATENT DOCUMENTS

| | | | |
|---|---|---|---|
| 3,015,461 | 1/1962 | Fineblum | 244/117 A |
| 3,090,212 | 5/1963 | Anderson et al. | 244/117 A |
| 3,093,348 | 6/1963 | Schelp et al. | 244/117 A |
| 3,101,588 | 8/1963 | Perry | 60/39.53 |
| 3,369,782 | 2/1968 | Billig et al. | 244/117 A |
| 3,929,305 | 12/1975 | Sabol | 244/117 A |
| 4,273,304 | 6/1981 | Frosch et al. | 244/117 A |

_Primary Examiner_—Trygve M. Blix
_Assistant Examiner_—Rodney Corl
_Attorney, Agent, or Firm_—Daniel J. Meaney, Jr.

[57] ABSTRACT

An aerodynamic heated steam generating apparatus having an aerodynamic heat immersion coil steam generator adapted to be located on the leading edge of an airframe of a hypersonic aircraft and being responsive to aerodynamic heating of water by a compression shock airstream to produce the steam pressure, expansion shock air-cooled condenser adapted to be located in the airframe rearward of and operatively coupled to the aerodynamic heat immersion coil steam generator to receive and condense the steam pressure, a steam pressure reacting device operatively coupled between the aerodynamic heat immersion coil steam generator and the expansion shock air-cooled condenser for driving a load and an aerodynamic heated steam injector manifold adapted to distribute heated steam into the airstream flowing through an exterior thrust generating channel of an air-breathing, ducted power plant is shown.

6 Claims, 5 Drawing Figures

AERODYNAMIC HEATED STEAM GENERATING APPARATUS

BACKGROUND OF THE INVENTION

1. Field of the Invention

This invention relates to a heat transfer system of an aircraft and more particularly relates to an aerodynamic heated steam generating apparatus adapted to be located on the airframe of a hypersonic aircraft. The apparatus includes a high temperature aerodynamic heating member comprising a finned tube positioned between an aerodynamic heating plate and insulated inner plate defining an aerodynamic heat immersion coil. The heat of aerodynamic heating is transferred to an aerodynamic heating plate which, in turn, transfers the heat through a coolant material wherein the heat is absorbed by an aerodynamic heat immersion coil to produce high pressure steam which is applied to a steam pressure reacting power plant. The hypersonic airframe has a low temperature airstream portion which encloses a recessed finned tube with the expansion shock airstream zones so as to form an expansion shock air-cooled condenser coil to produce condensed water from steam and the heated airstream flows into a thrust generating channel.

2. Description of the Prior Art

The use of the heat shield as a covering on a spacecraft or a rocket nosecone to protect the airframe from the intense heat produced during high speed flight is known. Common types of heat shields are heat sinks and ablation shields. Heat sinks absorb the heat thus preventing heat from reaching delicate parts of the spacecraft. One known heat sink is a high temperature heat proof tile which is located on the aerodynamic heating portion of a hypersonic vehicle. Ablation shields absorb heat by melting and vaporizing permitting the airstream passing by the vehicle to carry away from the vehicle the molten particles and hot gas vapor.

SUMMARY OF THE PRESENT INVENTION

The present invention relates to a new and novel aerodynamic heated steam generating apparatus for the hypersonic aircraft having an airframe comprising a high temperature aerodynamic heating portion and low temperature airstream portion. The high temperature aerodynamic heating portion encloses a finned tube immersed in a coolant material wherein both the fin and coolant material are located between an aerodynamic heating plate and an insulated inner plate. The aerodynamic heat immersion coil produces steam by the conduction heat transfer from the intense aerodynamic heat produced during high speed flight. The low temperature portion of an airframe encloses a finned tube recessed in the expansion shock airstream zones of the aircraft and functions as an expansion shock air-cooled condenser coil to produce a convection heat transfer into the oblique ram-airstream to produce condensed water in the coil from the steam transferred to the condenser coil.

The inlet to the heat immersion coil is supplied condensed water by means of a high pressure feed pump mounted on a condensed water accumulator. The outlet of the heat immersion coil is operatively coupled to a steam header which functions as a high pressure side of an aerodynamic heated steam generating power plant having a pressure and volume of steam produced by the aerodynamic heating relative to the speed and other operating parameters of flight.

The high pressure steam is applied to a pressure reactant device which, in turn, applies the steam to the low pressure side of condensed water accumulator through the condenser coil. The condenser coil transfers the heat from steam by convection to a ram-airstream and to a heated airstream which are inputs into a thrust generating channel.

A high pressure steam header is connected to a pressure regulating relief valve and vent pipe to discharge the steam into a steam discharge manifold. The condensed water accumulator has a steam blowdown vent which is operatively connected to the discharge steam manifold. The discharge steam manifold has a plurality of orifices which include steam distributing tubes for injecting steam into the airstream. The enthalpy of the airstream which flows into the thrust generating channel through the ducted air-breathing power plant is increased by the injection of steam into the ram-airflow.

One advantage of the aerodynamic heated steam generating apparatus of the present invention is that an aerodynamic heat transfer is made into the thrust generating channel from heat recovered in an aerodynamic system which concurrently avoids the problem of aerodynamic heating of the hypersonic airframe. Aerodynamically generated heat is absorbed by a steam generating coil. Heat is recovered by a low pressure condenser coil through heat convection transfer to an oblique ram-airstream which flows into the thrust generating channel.

An additional advantage of the aerodynamic heated steam generating apparatus of the present invention is that steam produced by the aerodynamic heating is applied to a power plant having a high pressure side to receive the steam and low pressure side wherein the low pressure steam is condensed to produce water permitting the pressure reactant device to be installed between high and low pressure sides.

Another advantage is that the pressure differential conversion of thermal energy from the aerodynamic heating enables the aerodynamic heated steam generating apparatus to function as an aerodynamic heat shield.

BRIEF DESCRIPTION OF THE DRAWING

The foregoing and other advantages and features of this invention will become apparent from the following description of the preferred embodiment, when considered together with the illustrations and accompanying drawing which includes the following Figures.

DESCRIPTION OF THE PREFERRED EMBODIMENT

Figure 1:
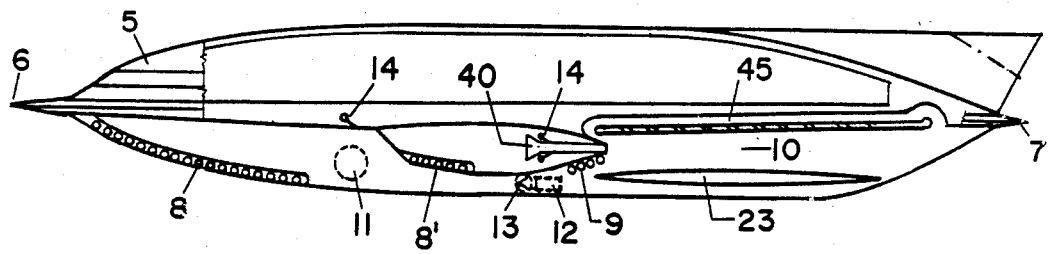
FIG. 1 is a pictorial representation of a hypersonic airframe showing an aerodynamic heated steam generating apparatus.

The aerodynamic heated steam generating apparatus for a hypersonic aircraft is illustrated in FIG. 1. The hypersonic aircraft includes a hypersonic airframe 5 having a leading edge 6 and a trailing edge 7. The forward underside wedge-shaped portion of the hypersonic airframe 5 is used for the high temperature aerodynamic heating surface and the rear underside ramp-shaped portion of the hypersonic airfoil 5 is used for the low temperature airstream surface.

The high temperature aerodynamic heating surface encloses a coil 8 and the low temperature airstream surface encloses an expansion shock air-cooled condenser coil 9 which is located in the inlet portion of an aerodynamic thrust generating channel 10. The steam pressure reactant device 11, condensed water accumulator 12 with condensed water recirculating feed pump 13 and the aerodynamic heated steam injectors, comprising the heat delivery systems, are installed inside the airframes.

Figure 2:
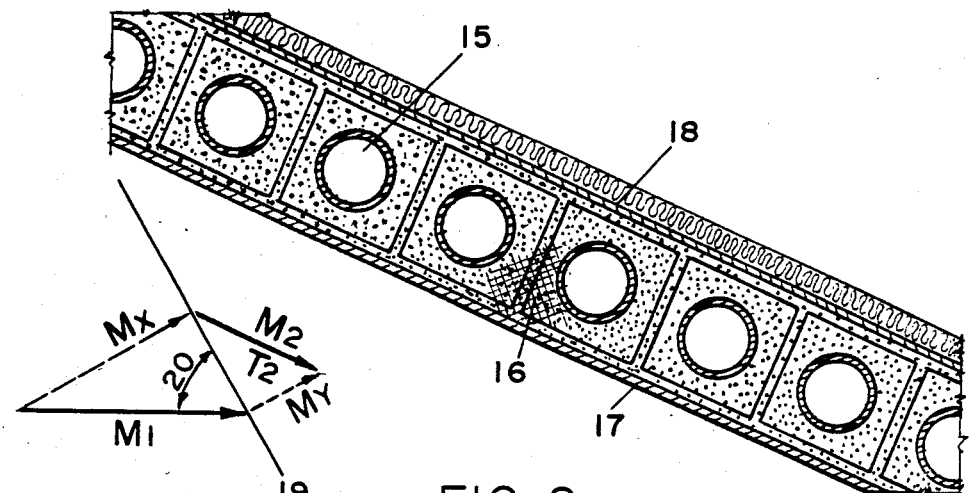
FIG. 2 is a partial cross section of an aerodynamic heat immersion coil showing the finned tube positioned between an aerodynamic heating plate and an insulated inner plate 18 having a coolant material surrounding the finned tube.

One embodiment of an aerodynamic heat immersion coil is illustrated in FIG. 2. The coil includes a finned tube 15 which is immersed in a coolant material 16. The tube 15 and the coolant material 16 are located between an aerodynamic heated plate 17 and an insulated inner plate 18. The aerodynamic heat immersion coil is fabricated as an aerodynamic heating portion on the forward underside of a hypersonic airframe which comprises the compression shock airstream zone of the aircraft. The shock angle 20 illustrated in FIG. 1 corresponds to the incoming Mach number M1 relative to shock line 19, Mx is the supersonic Mach number component of the incoming Mach number M1 normal to the shock line 19, M2 is the Mach number after the shock, and My is the subsonic Mach number component of M2 normal to the shock line 19.

The components Mx and My normal to the shock line 19 maintain their relationships to the incoming Mach number M1 and the shock Mach number M2.

The temperature after the compression shock varies from 3000 degrees to 12,000 degrees Rankine or more, depending on what portion of the airframe receives the compression shock which is a function of the speed and other parameters of flight.

The aerodynamic generated heat is absorbed by heat transfer by the aerodynamic heating plate and transferred to the coolant material and to the finned tube 15. The finned tube 15 utilizes the heat to produce steam having a pressure and sufficient volume for steam generation.

Figure 3:
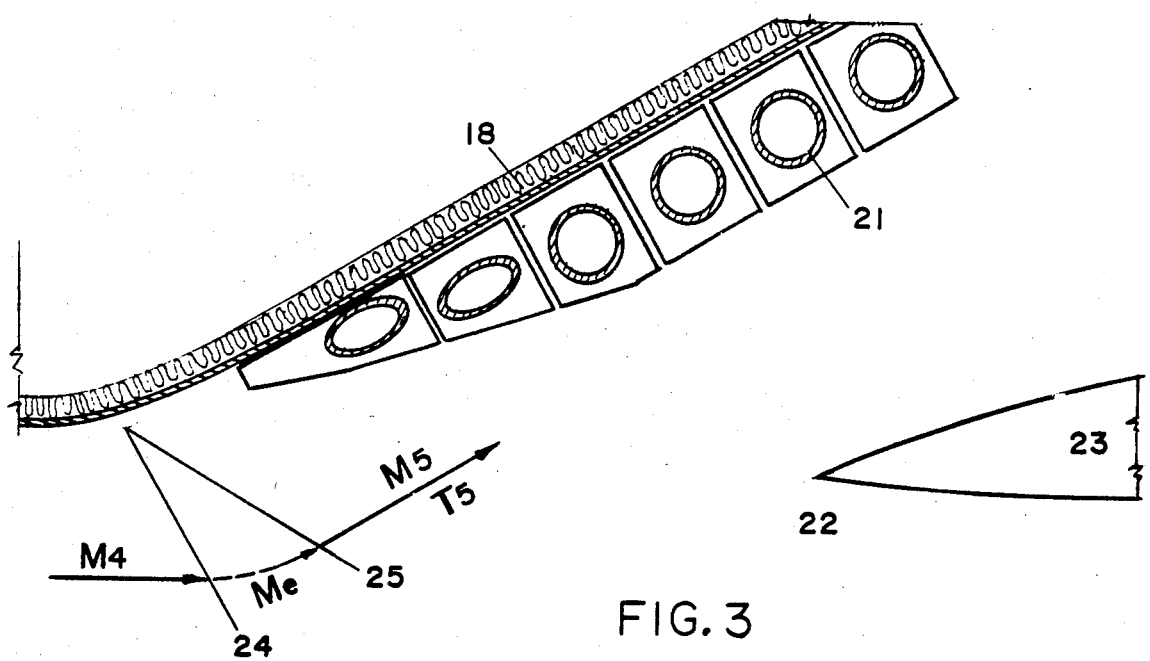
FIG. 3 is a partial cross section of an expansion shock air-cooled condenser coil showing the finned tube positioned in the airstream above the leading edge of a wing.

The expansion shock air-cooled condenser coil is illustrated in FIG. 3. The finned tube 21 is positioned to engage the expansion shock oblique ram-airstream illustrated as M5 in FIG. 2. The finned tube defines an expansion shock air-cooled condenser coil 9 which, as shown in FIG. 1, is located on the rear underside ramp portion of the air-breathing engine pod and positioned in the lower inlet portion of the thrust generating channel 10. The corner of the ramp airstream has an initial shock angle line 24 which corresponds to the speed of incoming Mach number M4. An expansion Mach wave Me emanates from the curvature of the ramp corner. The final expansion Mach wave occurs at angle line 25. The Mach number M5 commencing at line 28 corresponds to the ramp angle. The finned tube 21 functions as a condenser coil and contains the steam from the outlet of a steam pressure reactant device 11.

The steam in the condenser coil is cooled by the airstream. The cooled steam produces condensed water which, in turn, is used for the low pressure side of an aerodynamic heated steam generating apparatus. The heat transfer from the condenser coil to the airstream means heats the expansion shock oblique ram-airstream which flows into the thrust generating channel. The airstream temperature T5 after the expansion shock varies from 300 degrees to 600 degrees Rankine, corresponding to the speed and other parameters of flight.

The expansion shock oblique ram-airstream which flows over the condenser coil 9 receives heat originally generated by the aerodynamic heat immersion coil 8 on the forward portion of the spacecraft. Thus the condenser coil 9 functions to deliver heat into the thrust generating channel means defining an aerodynamic heat recovery system while the heat sink on the forward portion of the hypersonic aircraft defines a heating shield apparatus for the aircraft.

In use, the outlet of the condenser coil is piped to a condensed water accumulator and the condensed water is recirculating into the aerodynamic heat immersion coil for generating the steam from the thermal energy generated by the aerodynamic heating on the hypersonic aircraft.

Figure 5:
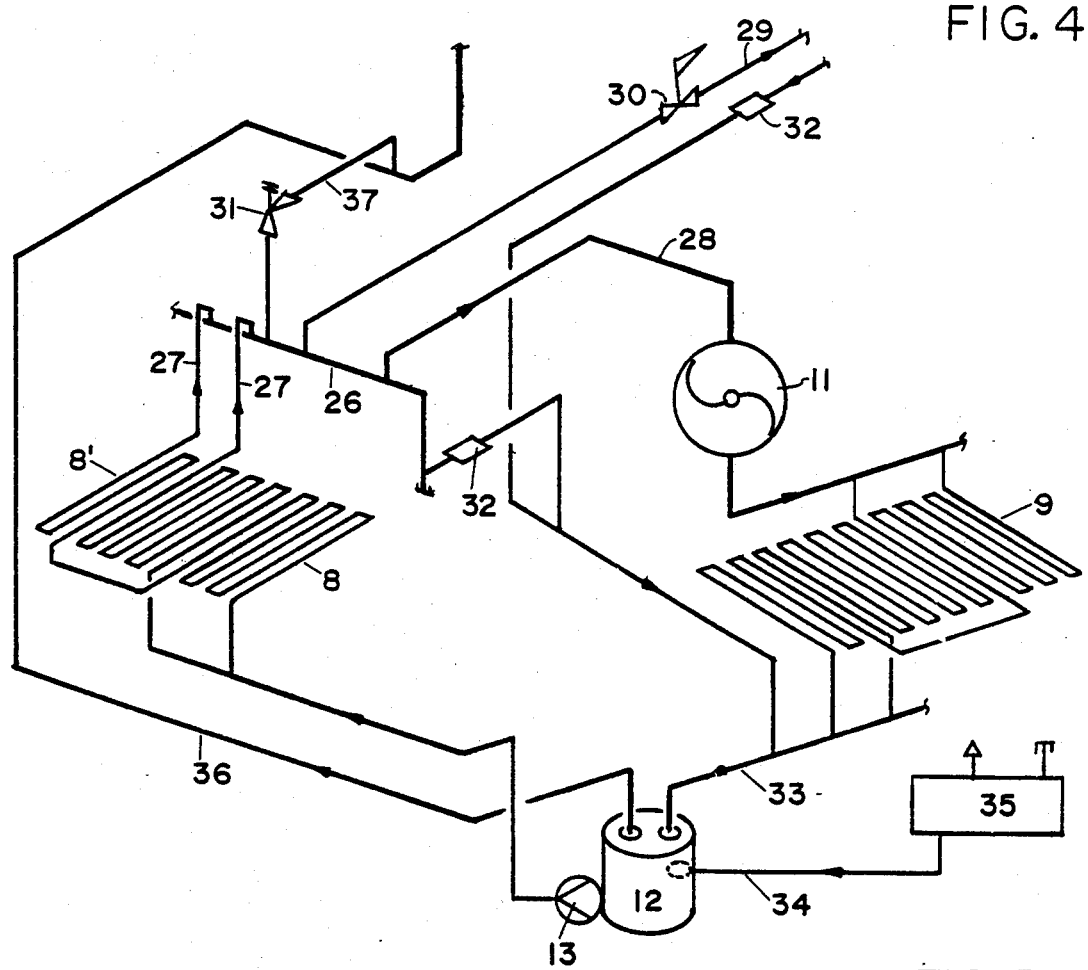
FIG. 5 is a schematic flow diagram of an aerodynamic heated steam generating power plan illustrating the aerodynamic heat immersion coil, the expansion shock air-cooled condenser coil, a steam pressure reactant device, a condensing water accumulator with feed pump, a steam header, and associated piping and controls.

In FIG. 5, the aerodynamic heated steam generating power plant is illustrated by a schematic flow diagram. The condensed water inlet to the aerodynamic heat immersion coil is shown as a primary boiling coil 8. The coil 8 evaporates the water to the steam. A high pressure feed pump 12 mounted on the condensed water accumulator 12 means applies condensed water into the steam generating boiling coil 8. The end rows of the primary boiling coil 8 function as superheated steam coil 8'. The outlets 27 of superheating coils 8' are applied to a superheated steam header 26. The superheated steam header 26 comprises the high pressure steam supply line 28 which functions as an inlet to a steam pressure reactant device 11 such as the steam turbine. A low pressure steam line 29 is fitted with steam pressure reducing station 30 for supplying steam at reduced pressure to a room air conditioner, a steam pressure regulating relief valve 31 and steam traps 32 for system warm-up. The downflow of pressure reactant device 11 is piped to the inlet of condenser coil 9. The outlet of condenser coil 9 and the downflows of the steam traps 32 are connected to the condensed water accumulator 12 so as to apply all condensed water to the water accumulator 12. The condensed water accumulator has a float control valve for controlling the water flow in water line 34 from a water storage tank 35 to the water accumulator 12. The condensed water accumulator 12 is equipped with the high pressure feed pump 13 which operates to recirculate condensed water back into the steam generating aerodynamic heat immersion coil 8.

A steam blowdown line 36 extends from the condensed water accumulator 12 to vent line 37. Vent line 37 is an input to the steam pressure regulating relief valve 31. The vent lines 36 and 37 are connected to an aerodynamic heated steam injector header including 5 manifolds 41 on the air intake 38 portion of an air-breathing power plant 39 and to the throat downstream of a ram induction airflow inducing nozzle 40. The aerodynamic heated steam injector steam distributing manifolds 41 terminate in a plurality of outlet tubes 42 stubouts which are inclined downstream relative to the airstream paths 43.

Figure 4:
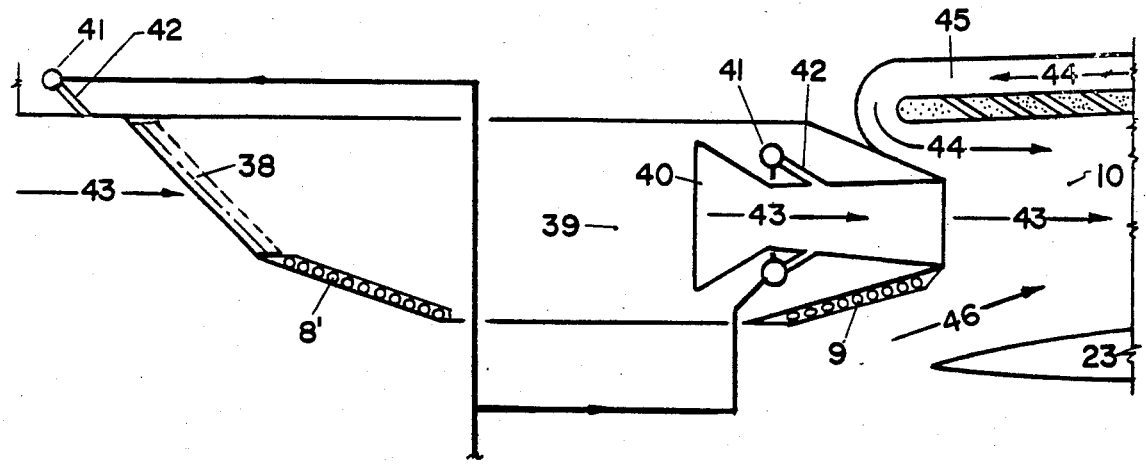
FIG. 4 is a pictorial representation of an inlet portion of aerodynamic heat receiving thrust generating channel having a jet thrust peripheral flow recycling airstream duct formed in the upper portion of the thrust generating channel and having a lower portion wherein a wing having a leading edge forms the lower inlet of the thrust generating channel and wherein the condenser coil for the aerodynamic heated steam apparatus is located forward of the thrust generating channel.

An aerodynamic heat receiving thrust generating channel is illustrated in FIGS. 1 and 4. The hypersonic airframe 5 has an intense aerodynamic heating portion which encloses the aerodynamic heat immersion coils 8 for generating a steam in response to the thermal energy received from the aerodynamic heating. The hypersonic airframe has a low temperature airstream portion which encloses the expansion shock air-cooled condenser coils 9 for aerodynamic heat transfer of heat from steam into the thrust generating channel 10. The condenser coil 9 is positioned in the low temperature airstream zones of the aircraft and receives the steam produced from aerodynamic heating. The steam is condensed, and the heat extracted during that process is transferred to the expansion shock oblique ram-airstream flowing into the thrust generating channel. The aerodynamic heated steam cooling condenser coil 9 is positioned in the lower inlet portion of a thrust generating channel 10. The upper inlet of the thrust generating channel 10 is an outlet of a jet thrust peripheral flow recycling airstream 44 which includes duct 45 which is located in the forward middle portion of a thrust generating channel 10. The thrust generating channel 10 functions as a nozzle 40 for an air-breathing power plant having a ducted airstream path of ram induction airflow. Further, the injector having steam distributing manifolds 41 applies steam from the blowdown of the condensed water accumulator 12 and vented steam from the steam pressure regulating relief valve 31 into the ram induction airflow.

The oblique ram-airstream 46 which passes into the inlet of the thrust generating channel 10 receives heat developed from the heat transfer of the condenser coil 9 and air-breathing jet power plant also receives latent heat from the aerodynamic heating delivery through the steam injector manifold 42. The recovered heat and the latent heat increase the total heat of the ram-airstream in the thrust generating channel means defining an aerodynamic heat receiving thrust generating channel for the hypersonic aircraft.

I claim:

1. An aerodynamic heated steam generating apparatus comprising
    an aerodynamic heat immersion coil steam generator adapted to be located on the leading edge of an airframe of a hypersonic aircraft and being responsive to aerodynamic heating of water by a compression shock airstream to produce steam pressure;
    an expansion shock air-cooled condensor adapted to be located in the airframe rearward of and operatively coupled to the aerodynamic heat immersion coil steam generator to receive and condense the steam pressure; and
    an aerodynamic heated steam injector manifold adapted to distribute heated steam into the airstream flowing through an exterior generating channel of an air-breathing, ducted power plant.

2. The apparatus of claim 1 further comprising
    a steam pressure reactant device operatively coupled between said aerodynamic heat immersion coil steam generator and said expension shock air-cooled condensor for driving a steam turbine.

3. An aerodynamic heated steam generating apparatus comprising
    an aerodynamic heat immersion coil steam generator adapted to be located on the leading of an airframe of a hypersonic aircraft and being responsive to aerodynamic heating of water by a compression shock air stream to produce steam pressure;
    an expansion shock air-cooled condensor adapted to be located in the airframe rearward of and operatively coupled to the aerodynamic heat immersion coil steam generator to receive and condense the steam pressure;
    a steam pressure reactant device operatively coupled between said aerodynamic heat immersion coil steam generator and said expension shock air-cooled condensor for driving a load; and
    an aerodynamic heated steam injector manifold adapted to distribute heated steam into the airstream flowing through an exterior thrust generating channel of an air-breathing, ducted power plant.

4. The apparatus of claim 3 wherein said aerodynamic heat immersion coil steam generator comprises
    an aerodynamic heating plate;
    an insulated inner plate positioned at a spaced distance from said heating plate forming a channel therebetween;
    a finned tube located in the channel between the heating plate and inner plate; and
    a coolant fluid located within the channel and surrounding said finned tube.

5. The apparatus of claim 3 wherein said expansion shock air-cooled condensor comoprises
    a finned tube adapted to be positioned on the rear, underside portion of an aircraft so as to be immersed in the expansion shock oblique ram airstream passing over the underside of the aircraft.

6. An aerodynamically heated, steam generating apparatus for an aircraft having an airframe which houses an air-breathing, ducted power plant and wherein the aircraft is adapted to travel at hypersonic speeds to generate a compression shock airstream zone in the forward part of the aircraft and an expansion shock oblique ram airstream passing over the underside of the aircraft, said steam generating apparatus including
    an aerodynamic heat immersion coil steam generator located on the leading edge of an airframe of a hypersonic aircraft and being responsive to aerodynamic heating of water by a compression shock air stream to produce steam pressure;
    an expansion shock air-cooled condensor located in the airframe rearward of and operatively coupled to the aerodynamic heat immersion coil steam generator to receive and condense the steam pressure;
    a steam pressure reactant device operatively coupled between said aerodynamic heat immersion coil steam generator and said expansion shock air-cooled condensor for driving a load; and
    an aerodynamic heated steam injector manifold operatively coupled to the air-breathing, ducted power plant to distribute heated steam into the airstream flowing through an exterior thrust generating channel of the air-breathing, ducted power plant.

* * * * *